US007669327B2

(12) United States Patent
Thompson

(10) Patent No.: US 7,669,327 B2
(45) Date of Patent: Mar. 2, 2010

(54) METHODS OF APPLYING OZONE-DEPLETING CATALYSTS TO HEAT EXCHANGERS

(75) Inventor: Mark Thompson, Summerville, SC (US)

(73) Assignee: JW Aluminum Company, Mount Holly, SC (US)

( * ) Notice: Subject to any disclaimer, the term of this patent is extended or adjusted under 35 U.S.C. 154(b) by 991 days.

(21) Appl. No.: 10/931,839

(22) Filed: Sep. 1, 2004

(65) Prior Publication Data

US 2006/0042085 A1 Mar. 2, 2006

(51) Int. Cl.
*B21D 51/16* (2006.01)
(52) U.S. Cl. .................. 29/890; 29/890.03; 29/890.041; 165/133; 165/166; 228/183; 228/262.5; 427/427; 502/333
(58) Field of Classification Search ................... 29/890, 29/890.03, 890.041; 228/183, 195, 262.51; 228/262.5; 165/133, 166, 134.1; 502/333; 427/427
See application file for complete search history.

(56) References Cited

U.S. PATENT DOCUMENTS

| | | | | |
|---|---|---|---|---|
| 4,812,086 A | * | 3/1989 | Kopernicky | 406/153 |
| 5,145,822 A | | 9/1992 | Falke et al. | 502/150 |
| 5,187,137 A | | 2/1993 | Terui et al. | 502/241 |
| 5,212,140 A | | 5/1993 | Yoshimoto et al. | 502/300 |
| 5,221,649 A | | 6/1993 | Yoshimoto et al. | 502/84 |
| 5,262,129 A | | 11/1993 | Terada et al. | 422/122 |
| 5,296,435 A | | 3/1994 | Kitaguchi et al. | 502/174 |
| 5,422,331 A | * | 6/1995 | Galligan et al. | 502/333 |
| 5,993,909 A | | 11/1999 | Mizutani et al. | 427/379 |
| 5,997,831 A | | 12/1999 | Dettling et al. | 423/219 |
| 6,190,627 B1 | | 2/2001 | Hoke et al. | 423/219 |
| 6,281,159 B1 | | 8/2001 | Fromson et al. | 502/324 |
| 6,361,872 B1 | * | 3/2002 | Hosono et al. | 428/467 |
| 6,375,905 B1 | | 4/2002 | Moini et al. | 422/180 |
| 6,486,092 B2 | | 11/2002 | Fromson et al. | 502/324 |
| 6,540,843 B1 | | 4/2003 | Liu et al. | 148/243 |
| 6,555,079 B2 | | 4/2003 | Hoke et al. | 423/210 |
| 6,569,393 B1 | | 5/2003 | Hoke et al. | 423/219 |
| 6,681,619 B2 | | 1/2004 | Alleving et al. | 73/118.1 |
| 6,682,774 B2 | * | 1/2004 | Smith et al. | 427/180 |
| 6,684,629 B2 | | 2/2004 | Bayerle et al. | 60/277 |
| 6,699,529 B2 | * | 3/2004 | Garner et al. | 427/427 |
| 6,818,254 B1 | | 11/2004 | Hoke et al. | |
| 6,926,784 B2 | | 8/2005 | Bock | |
| 6,945,321 B2 | * | 9/2005 | Hosoya et al. | 165/133 |
| 7,067,454 B2 | | 6/2006 | Raybould | |
| 2004/0043156 A1 | | 3/2004 | Emch | 427/385.5 |

* cited by examiner

*Primary Examiner*—Rick K Chang
(74) *Attorney, Agent, or Firm*—Myers Bigel Sibley & Sajovec

(57) ABSTRACT

Methods of applying an ozone-depleting catalytic coating to a heat exchanging device for producing a durable surface with optimal ozone depletion characteristics are provided. An adhesively coated metallic substrate is exposed to a concentration of ozone-depleting catalytic particles, wherein the receptive surface of the coated substrate binds the ozone-depleting catalytic coating.

25 Claims, 9 Drawing Sheets

US 7,669,327 B2

METHODS OF APPLYING OZONE-DEPLETING CATALYSTS TO HEAT EXCHANGERS

TECHNICAL FIELD

The present disclosure is generally related to systems and methods for applying coating to substrates and, more particularly, is related to systems and methods for providing ozone-depleting catalysts in heat exchanger applications.

BACKGROUND

Compositions capable of performing, for example, a catalytic reduction of ozone to oxygen have been developed. For example, U.S. Pat. No. 5,221,649 to Yoshimoto et al., discloses catalysts and methods for ozone depletion. Further, methods of catalytically treating the atmosphere using heat exchange devices are disclosed in U.S. Pat. No. 5,997,831 to Dettling et al. These methods produce a surface with catalytic particles either partially or fully isolated from the atmosphere by a thin film or covering.

Reference is now made to FIG. 1, which illustrates a cross-sectional view of a substrate coated with catalytic conversion particles using methods of the prior art. The metallic substrate 110 has an adhesive coating 120 and catalytic conversion particles 130, 140, 150. For example, some of the particles 130 are covered by a thin film of the adhesive coating 120, thus reducing the capacity of that particle to contact the atmosphere and thus convert atmospheric ozone. Also, by way of example, note that other particles 140 are substantially covered by the adhesive coating 120, thereby reducing the particle surface exposed to the atmosphere. The totally and partially covered particles 130, 140 can be the result of a catalytic conversion coating delivery system which utilizes a slurry as a medium for applying the particles.

One means of providing consistently increased ozone conversion rates is to increase the amount of exposed surface area of the catalytic conversion material. Thus, a heretofore-unaddressed need exists in the industry to address the aforementioned deficiencies and inadequacies.

SUMMARY

Embodiments of the present disclosure provide a system for applying an ozone-depleting coating to a heat exchanger component comprising: a first coating device, for applying a liquid coating to a metallic sheet; a curing device, for curing the liquid coating on the metallic sheet, such that the liquid coating cures into an elastic coating; a heating device, for heating a coated metallic sheet, such that the adhesive properties of the elastic coating initiate; a second coating device, for applying an ozone-depleting solid particulate coating to the coated metallic sheet, wherein the ozone-depleting solid particulate coating is comprised of a plurality of coating particles, such that a portion of the plurality of coating particles adheres to the elastic coating.

An embodiment of the present disclosure can also be viewed as providing methods for applying an ozone-depleting coating to a heat exchange device, comprising the steps of: applying a liquid coating to a metallic sheet; curing the liquid coating; producing a heat exchange device, wherein the coated metallic sheet comprises a component; heating the heat exchange device; and contacting the heat exchange device with a solid particulate coating, wherein the solid particulate coating adheres to the heat exchanger.

Another embodiment of the present disclosure can be viewed as a system for applying an ozone-depleting coating to a heat exchange device, comprising: a liquid coating means for applying a liquid coating to a metallic sheet; a drying means for drying the liquid coating on the metallic sheet, such that the liquid coating dries into an elastic coating; a fabricating means for transforming a coated metallic sheet into heat exchange device components; an assembling means for assembling a heat exchange device; a heating means for heating the heat exchange device, such that the elastic coating is configured to initiate an adhesive property; and a dry coating means for applying a solid particulate coating to the heat exchange device, such that the solid particulate coating adheres to the elastic coating, the solid particulate coating further comprising an ozone-depleting material.

Another embodiment of the present disclosure can be viewed as a system for applying an ozone-depleting coating to a metallic sheet comprising: a first coating device, for applying a liquid coating to a metallic sheet, wherein the liquid coating presents a surface receptive to particulate adhesion; a second coating device, for applying an ozone-depleting solid particulate coating to the coated metallic sheet, wherein the ozone-depleting solid particulate coating particles which contact the liquid coating are adhesively retained; and a curing device, for curing the liquid coating on the metallic sheet, such that the liquid coating cures into an elastic coating.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 1 illustrates a cross-sectional view of a substrate coated with catalytic particles using the methods of the prior art.

FIG. 2 illustrates a representation of a cross-sectional view of a substrate with an ozone-depleting catalyst coating applied.

FIG. 3 is a block diagram illustrating an embodiment of a method for applying ozone-depleting catalysts to a metallic substrate.

FIG. 4 is a block diagram illustrating an embodiment of a method for applying an ozone-depleting catalytic coating to a heat exchanging device.

FIG. 5*a* illustrates a side view of an embodiment of a configuration for applying a liquid coating to a metallic sheet using a roll and curing the coating.

FIG. 5*b* illustrates a side view of an alternative embodiment of a configuration for applying a liquid coating to a metallic sheet using a roll and curing the coating.

FIG. 6*a* illustrates a side view of an embodiment of a configuration for applying a liquid coating directly to a metallic sheet and curing the coating.

FIG. 6*b* illustrates a side view of an alternative embodiment of a configuration for applying a liquid coating directly to a metallic sheet and curing the coating.

FIG. 7a illustrates a side view of an embodiment of a method of applying a solid particulate coating to a previously coated sheet.

DETAILED DESCRIPTION

Figure 1:
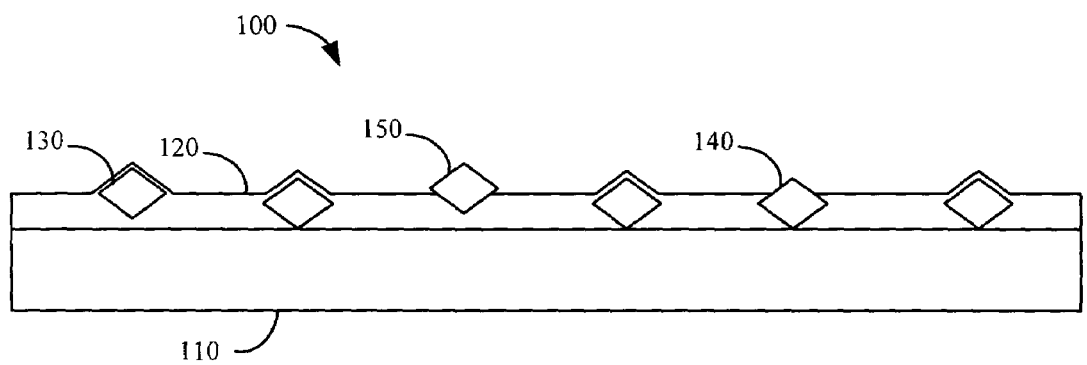
Figure 2:
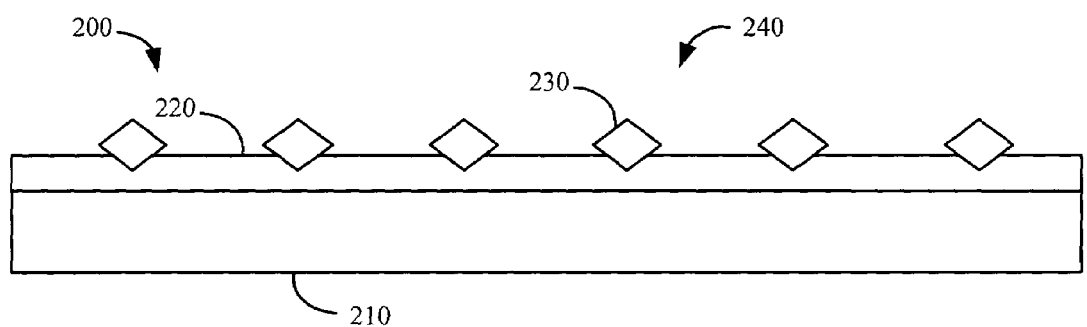

Reference is now made to FIG. 2, which illustrates a representation of a cross-sectional view of a substrate with an ozone-depleting catalyst coating applied. The coated substrate 200 includes the base substrate 210, which, by way of example, is a metallic sheet. At least one surface of the base substrate 210 is coated with, for example, a heat activated adhesive coating 220. Coatings of this type are frequently applied in liquid form and subsequently cured using, for example, heat. The temperature range for curing the heat activated liquid adhesive coating of this embodiment is preferably between 250 and 550 degrees Fahrenheit, more preferably between 300 and 500 degrees Fahrenheit, and more preferably between 400 and 450 degrees Fahrenheit. A solid particulate coating 230 of, for example, ozone-depleting catalysts, is adhered to at least one side of the substrate 210 by the adhesive properties of the heat activated adhesive coating 220. A significant portion of the surface area of the particles in the solid particulate coating 230 is exposed to the atmosphere 240 and thus, is available to perform the catalytic ozone conversion.

The heat activated or liquid coatings in this disclosure may be but are not limited to re-heatable adhesive or heat-seal coatings in any one of the acid copolymers and ionomers, metallocenes, erethanes, plastomers, linear ethylene polymers and any and all tackifier resins. For exemplary purposes, the acid copolymers and ionomers would include but not be limited to ethylene acrylic acid, vinyl acetate types, ethylene methyl acrylate and ethylene butyl acrylate. Further, the solid particulate coating of ozone-depleting catalysts may include but is not limited to Manganese Dioxide, Palladium, Palladium Dioxide and Titanium Dioxide.

Figure 3:
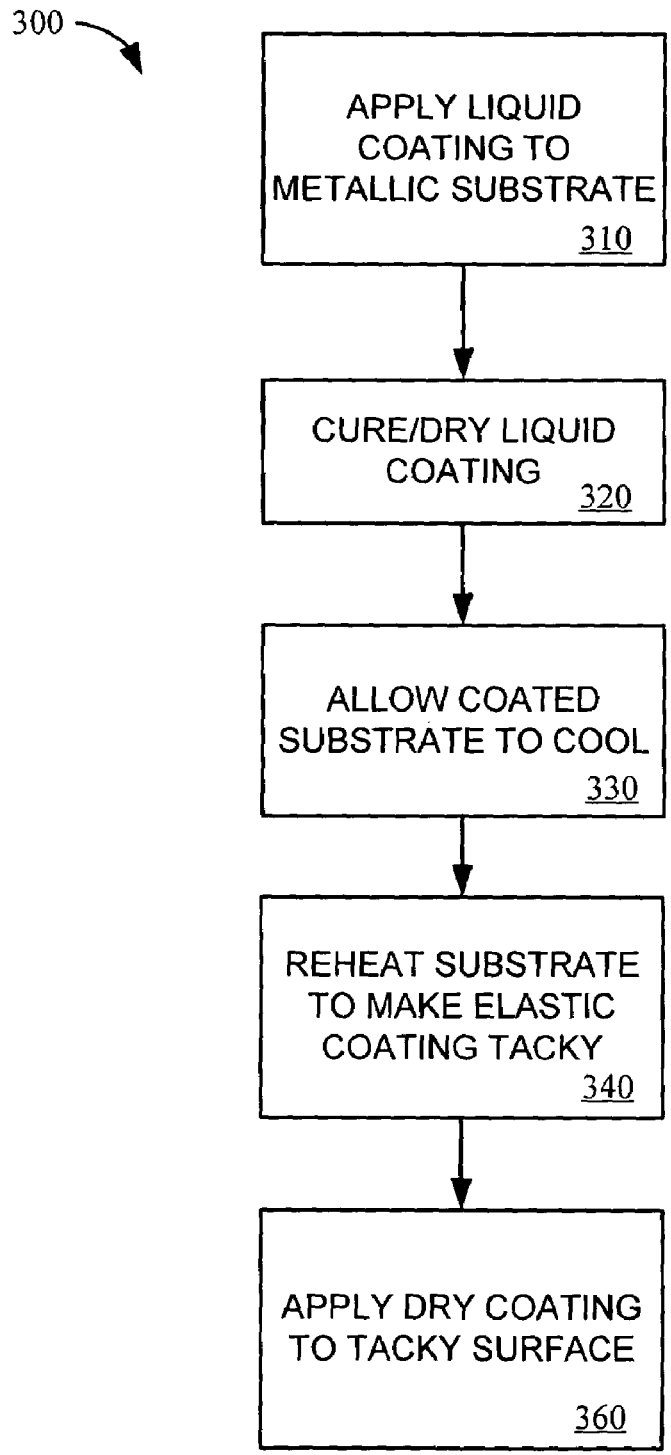

Referring now to FIG. 3, which illustrates an embodiment of a method of applying ozone-depleting catalysts to a metallic substrate. The method 300 of this embodiment has a first step of applying a liquid coating to a metallic substrate 310. The application of liquid coating to a metallic substrate can be performed using a variety of liquid coating delivery devices and methods. For example, one form of a liquid coating delivery device can be a coated roll where the roll is partially submerged in the liquid coating. Alternatively, the coating may be applied to the roll using a liquid delivery device such as a spray nozzle. Further, the coating could be applied directly to the metallic substrate 310 using a liquid coating delivery device. In an alternative embodiment, the adhesive coating could be applied adhesively to the metallic substrate 310 as a laminate in sheet form.

After the liquid coating is applied to the metallic substrate 310, the liquid coating is then cured or dried 320 with a curing device. The curing step 320 may be performed through, for example, the application of heat energy. The heat energy may be delivered by a variety of device types, including combustible fuel powered devices, electric resistance devices, electric inductance devices and electromagnetic wave devices.

After the coated metallic substrate is allowed to cool 330, sufficient heat energy is applied to make the elastic coating tacky 340. When the surface achieves a desired level of adhesiveness such that it becomes adhesively receptive, solid particulate ozone-depleting catalysts are applied to the receptive surface 350 for adhesion to the metal substrate. The resulting metal substrate has a durable coating of ozone-depleting catalyst particles, wherein significant portions of the particle surface areas are exposed to the atmosphere for converting ozone.

Figure 4:
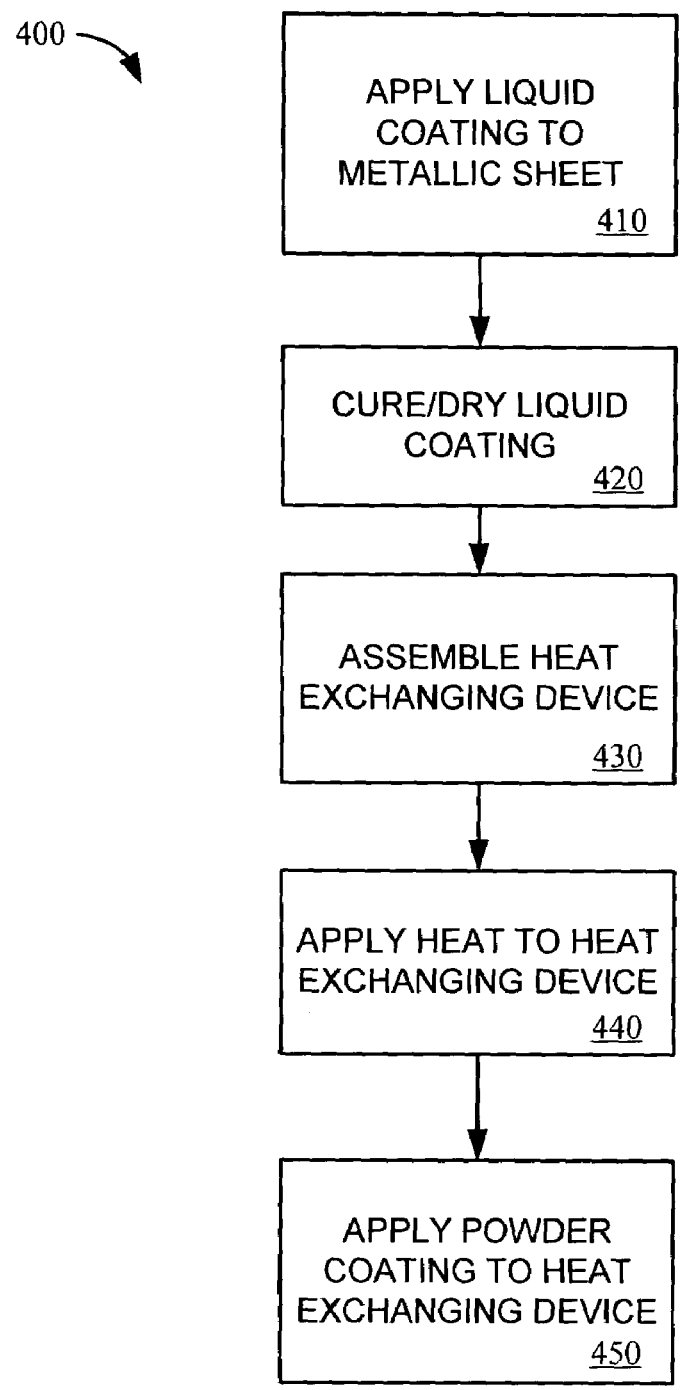

Reference is now made to FIG. 4, which is a block diagram illustrating an embodiment of a method of applying an ozone-depleting catalytic coating to a heat exchanging device. The method 400 starts with the application of a liquid coating to a metallic sheet 410. The liquid coating is cured or dried 420 using, for example, methods and devices discussed above. A heat exchanging device is assembled 430 using, in part, the coated metallic sheet. The assembling step can include reducing the metallic sheet to specific dimensions by slitting, cutting, forming and punching (not shown) the metallic sheet for engaging other of the heat exchanger components.

Heat energy is applied to the heat exchanging device 440 wherein the coated metallic sheet components become tacky or sticky and thus, adhesively receptive. The temperature range to which the heat exchanging device 440 is heated to become adhesively receptive is preferably between 80 and 400 degrees Fahrenheit, preferably between 110 and 165 degrees Fahrenheit, and preferably between 120 and 130 degrees Fahrenheit. After the coated metallic sheet components become adhesively receptive, a solid particulate coating of ozone-depleting catalytic particles is applied to the heat exchanging device 450. The particles which come in contact with the receptive surfaces of the heat exchanging device adhere, yet remain substantially uncovered by any film or residue.

Figure 5A:
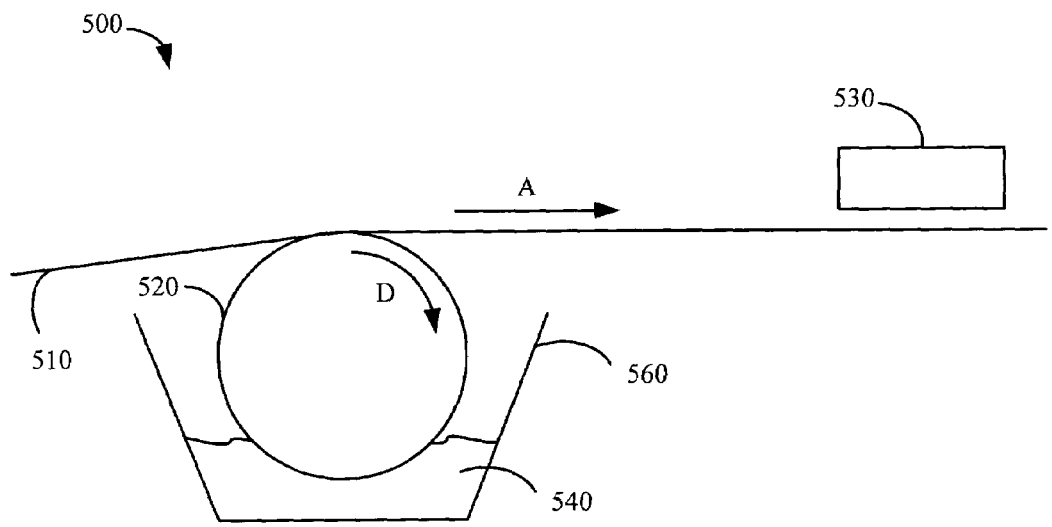

Reference is now made to FIG. 5a, which illustrates a side view of an embodiment of a configuration for applying a liquid coating to a metallic sheet and curing the coating. The metallic sheet 510 is driven in the direction A, generally across a coating roll 520. The coating roll, for example, rotates in a direction D and is partially immersed in a solution of liquid coating 540. The liquid coating 540 is maintained within a vat or trough 560. As the coating roll 520 rotates in conjunction with the linear travel of the metallic sheet 510, the liquid coating 540 is picked up by the coating roll 520 and deposited on the metallic sheet 510. The coated sheet then passes in proximity to a curing device 530. The curing operation may be performed, as discussed above, through the application of heat. The curing device 530 can generate heat through a combustion of fuel, electric resistance, electric inductance, and electromagnetic waves.

Figure 5B:
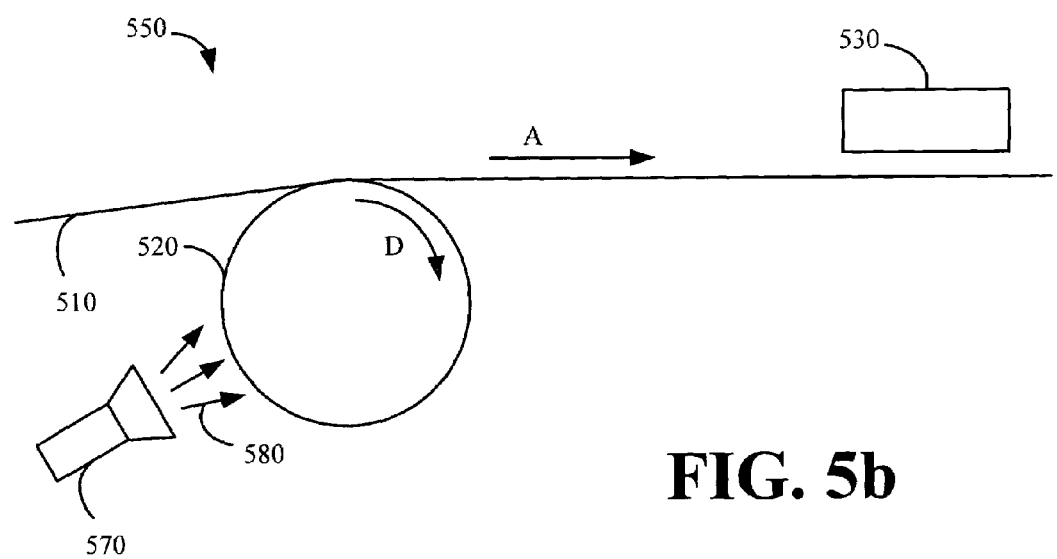

Similarly, reference is now made to FIG. 5b, which illustrates a side view of an alternative embodiment of a system for applying a liquid coating to a metallic sheet and curing the coating. Under this method 550, the liquid coating 580 is applied to the coating roll 520 using a device for projecting the coating onto the roll. One such type of device might be, for example, one or more spray nozzles generating a pattern or stream of coating in the direction of the coating roll 520.

Figure 6A:
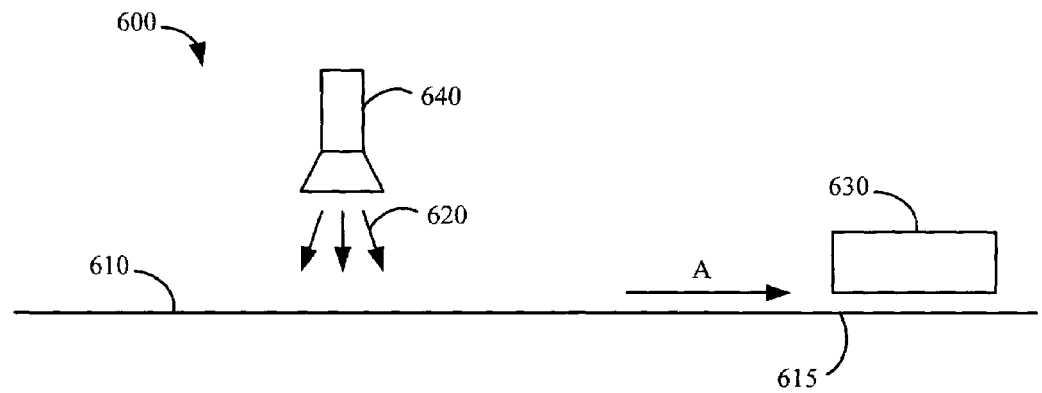

A side view of another alternative embodiment of a method of applying a liquid coating to a metallic sheet and curing the coating is shown in reference to FIG. 6a. Metallic sheet 610 moves in direction A through a stream or spray pattern of liquid coating 620. The stream or spray pattern of liquid coating 620 may be generated, for example, by one or more spray nozzles for directing the liquid coating toward the metallic sheet. The coated metallic sheet 615 is then subjected to a curing device 630.

Figure 6B:
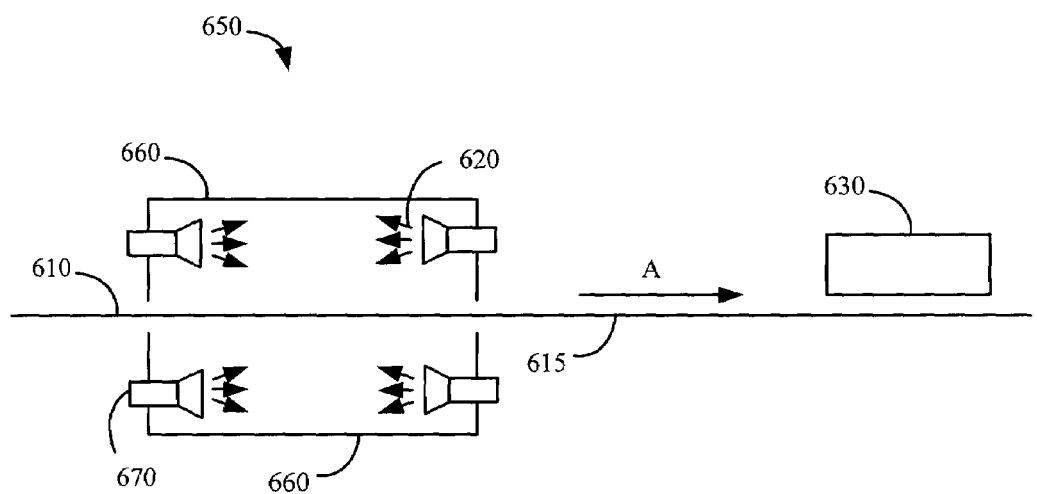

Reference is now made to FIG. 6b, which illustrates a side view of an alternative embodiment for applying a liquid coating to a metallic sheet and then curing the coating 650. The metallic sheet 610 travels in direction A through a chamber or enclosure 660. Within the chamber or enclosure, at least one device 670 is configured to disperse the liquid coating 620 in a mist or atomized form. Additionally, the delivery devices 670 may apply an electrical charge to the atomized coating which is opposite the electrical charge of the metallic sheet 610. As the metallic sheet 610 passes through the enclosure 660, the charged coating droplets 620 are electrostatically drawn to the metallic sheet 610. The coated metallic sheet 615 is then subjected to the curing device 630. In accordance with the discussion above, curing may be accomplished by applying heat through combustion, electric resistance, electric inductance, or electromagnetic waves.

Figure 7A:
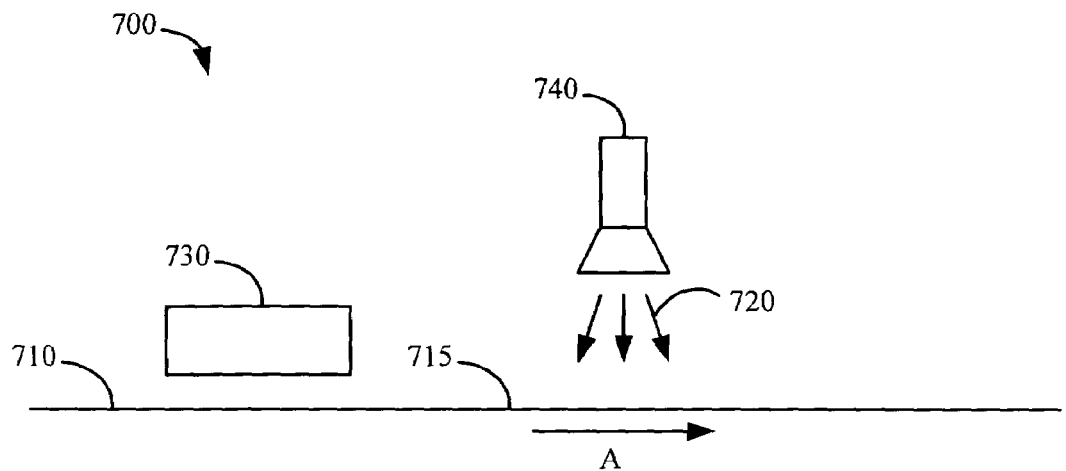
FIG. 7b illustrates a side view of an alternative embodiment for applying a solid particulate coating to a previously coated sheet.

Reference is now made to FIG. 7a, which illustrates a side view of an embodiment of performing the solid particulate coating step 700. A previously coated metallic sheet 710 moving in direction A, is subjected to a heating device 730. As discussed above, the heating device can utilize numerous techniques for transmitting heat energy to the coated metallic sheet 710. The heated, coated metallic sheet 715 is adhesively receptive and passes in proximity to a concentration of solid particulate coating 720. Particles in the concentration of solid particulate coating 720 adhere to the heated, coated metallic sheet 715 because of the tacky or adhesive nature of the previously applied liquid coating (FIGS. 5a, 5b, 6a and 6b). The coating methods of this and other embodiments may be used to apply coating on one or both sides of a metallic sheet.

Figure 7B:
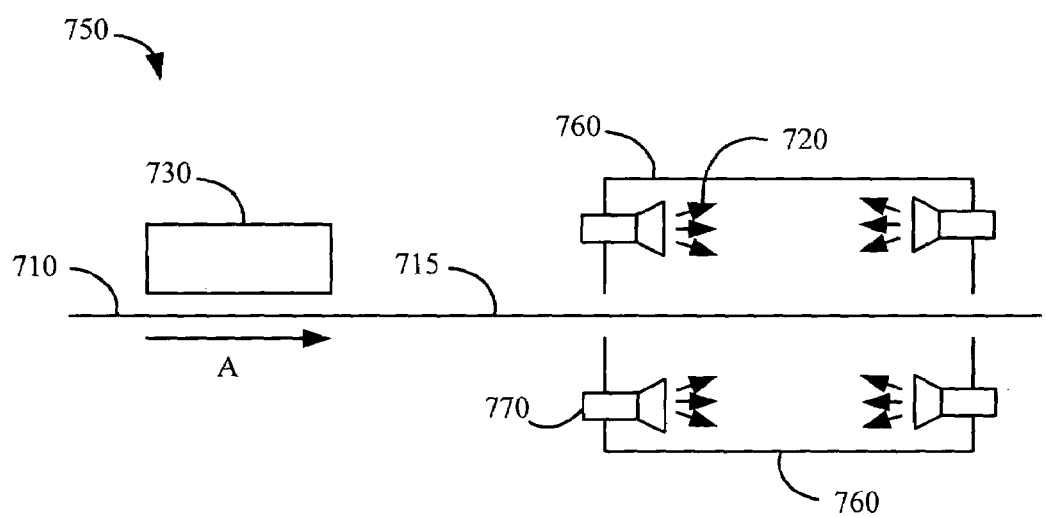

Referring now to FIG. 7b, which illustrates a side view of an embodiment for applying a solid particulate coating 750, the previously coated metallic sheet 710 travels in direction A. Consistent with the embodiment discussed in FIG. 7a, the coated metal sheet 710 is heated by a heating device 730. The heated, coated metallic sheet 715 enters a coating chamber or enclosure 760 for exposure to a concentration of solid particulate coating 720. Solid particulate coating 720 is delivered by, for example, sprays or blowers 770. The tacky or adhesive characteristic of the heated, coated metallic sheet 715 provides a receptive surface for the individual particles of the concentration of solid particulate coating 720 to adhere.

Figure 8A:
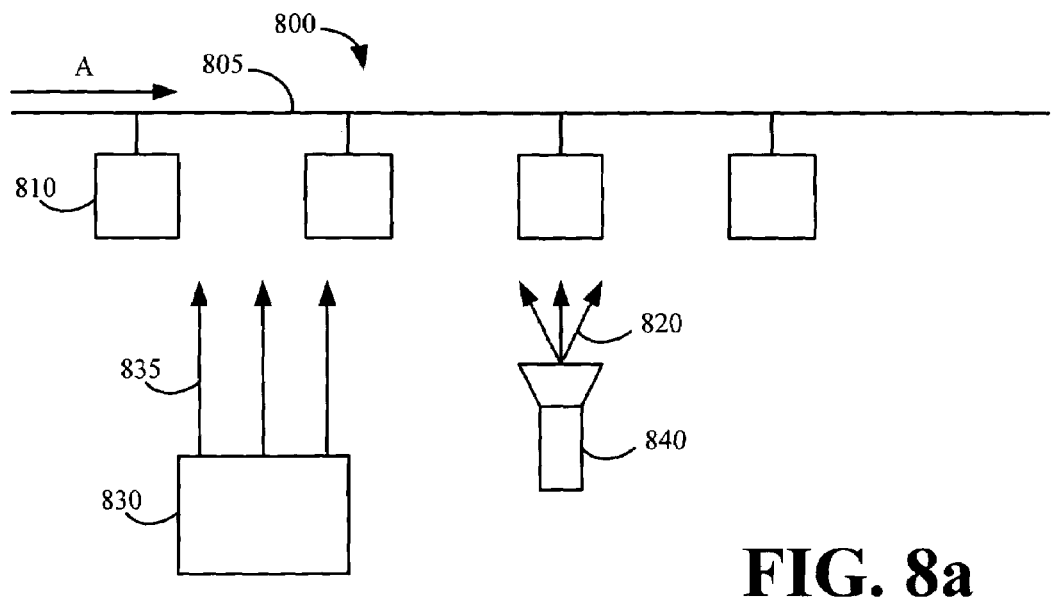
FIG. 8a illustrates an embodiment of a method of applying a solid particulate coating to a heat exchanging device.

Reference is now made to FIG. 8a, which illustrates a side view of an embodiment of a system for applying a solid particulate coating to a heat exchanging device. A heat exchanging device 810 is moved, for example, along a conveying type device 805 in direction A. The heat exchanging device 810 is fabricated, in part, using components previously coated with a liquid heat activated adhesive coating as discussed above. The heat exchanging device 810 receives heat energy 835 from a heating device 830 for the purpose of increasing the adhesive characteristic of the previously coated surfaces of the heat exchanging device 810. After the heat exchanging device 810 is heated such that the surface of the previously coated material is tacky, a concentration of solid particulate coating 820 is directed to the heat exchanging device 810. The solid particulate coating 820 is directed using a solid coating delivery device 840 such as, for example, a dry sprayer or blower. The solid coating delivery device 840 may comprise a device having a plurality of solid particulate coating delivery points positioned to direct the solid particulate coating 820 toward the heat exchanging device 810 from multiple directions.

Additionally, the solid particulate coating 820 has a substantially higher hardness characteristic than the previously coated materials used in the fabrication of the heat exchanging device. By applying the solid particulate coating 820 to the heat exchanging device 810 instead of its constituent components, the wear on the tooling used to form the components is significantly reduced.

Figure 8B:
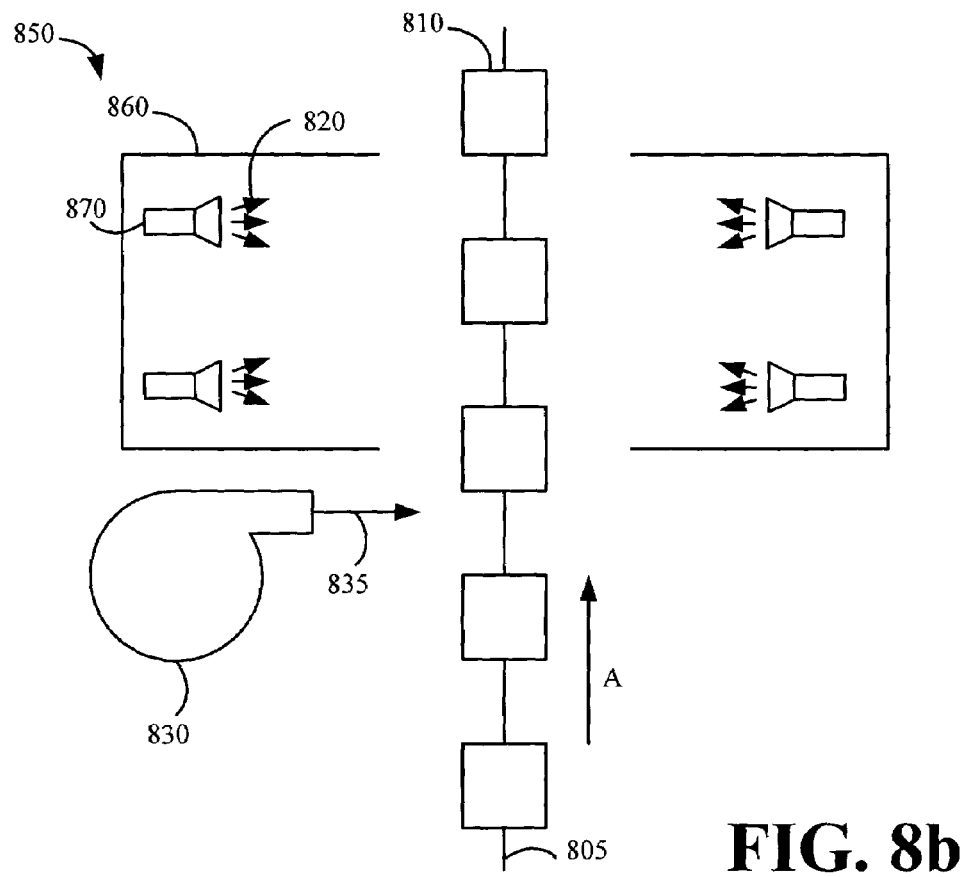
FIG. 8b is a side view of an alternative embodiment of a method of applying a solid particulate coating to previously coated surfaces of a heat exchanging device.

Reference is now made to FIG. 8b, which illustrates a side view of an alternative embodiment of applying a solid particulate coating to a heat exchanging device. A heat exchanging device 810 moves in direction A via a conveying device 805. The heat exchanging device 810 receives heat energy 835 from a heating device 830. The heat energy 835 initiates the adhesive characteristic of the previously coated surfaces of the heat exchanging device wherein the surfaces become receptive to particles of a solid particulate coating 820. After receiving the heat energy 835, the heat exchanging device 810 is conveyed into a coating chamber or enclosure 860. Within the coating chamber 860, at least one solid coating delivery device 870 creates a suspended concentration of solid particulate coating 820. The particles of the solid particulate coating 820 which come in contact with the adhesively receptive surfaces of the heated heat exchanging device 810 adhere to produce a durable coating of ozone-depleting catalysts.

Figure 9:
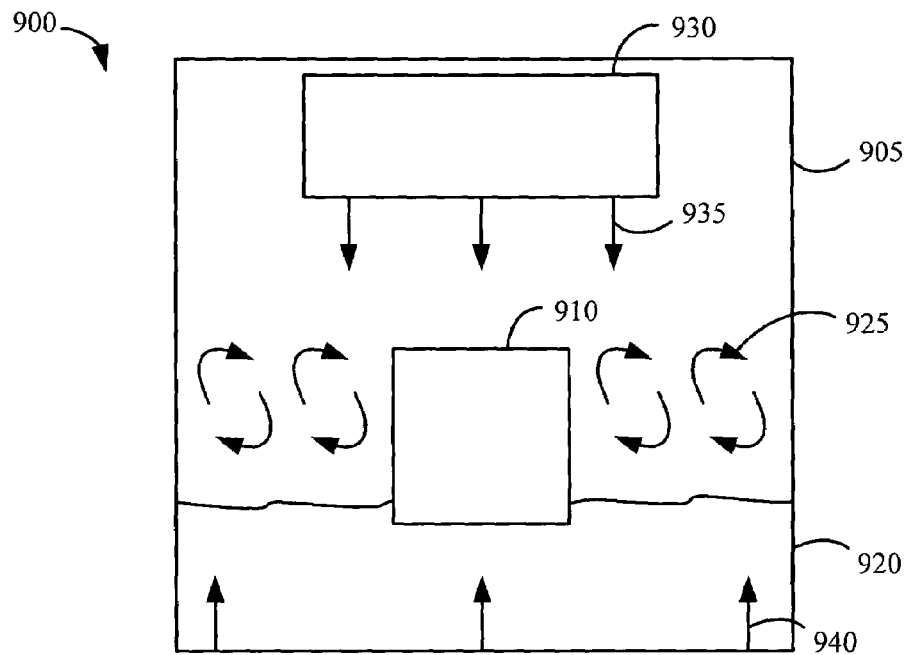
FIG. 9 illustrates a side view of an alternative embodiment of a method of applying a solid particulate coating to previously coated surfaces of a heat exchanging device.

Reference is now made to FIG. 9, which illustrates a side view of an alternative embodiment of a method of applying a solid particulate coating. A heat exchanging device 910 is placed inside a coating chamber or enclosure 905. The heat exchanging device 910 is supported, for example, in a suspended manner (not shown) or on a rack or grate (not shown). Heat energy 935 is applied using a heating device 930, such that the previously coated surfaces of the heat exchanging device 910 initiate an adhesive characteristic coincident with the increase in temperature. An accumulation of solid particulate coating 920 is stirred using a fluidizing input 940. The fluidizing input 940 may, for example, be one or more blowers or sources of compressed air or other gas (not shown). Application of the fluidizing input 940 to the accumulation of solid particulate coating 920 creates a fluidized bed 925 of solid particulate coating 920. This fluidized bed 925 of solid particulate coating 920 presents a highly concentrated and dynamic cloud of solid particulate coating 920 particles to the receptive surfaces of the heated heat exchanging device 910. One of ordinary skill in the art will appreciate that the concentration of solid particulate coating 920 deposited on the heat exchanging device 910 is, in part, a function of the configuration of the fluidized bed, the duration of exposure and the amount and adhesive quality of the previously applied coating.

Figure 10:
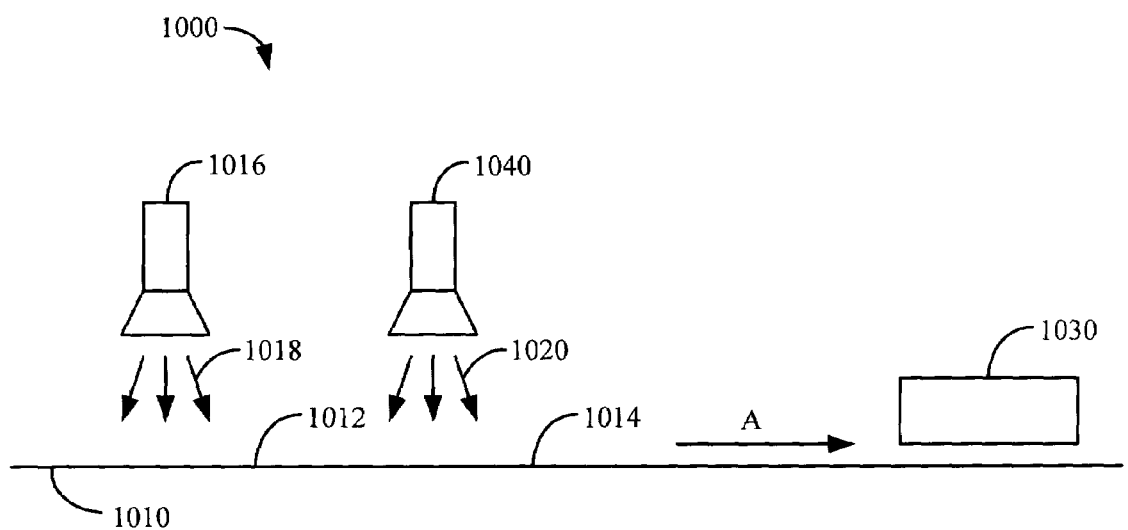
FIG. 10 illustrates a side view of an alternative embodiment of a method of applying ozone depleting catalysts to a metallic sheet.

Reference is now made to FIG. 10, which illustrates a side view of an alternative embodiment of a method of applying ozone-depleting catalysts to a metallic sheet, wherein the metallic sheet is formed as a component of a heat exchanging device. A metallic substrate 1010 moves in direction A and receives an adhesive coating 1018 from an adhesive coating device 1016. As discussed above, the adhesive coating 1018 may be applied to the metallic substrate 1010 using any number of methods. The adhesively coated metallic substrate 1012 is exposed to a concentration of solid particulate coating 1020 via a solid particulate coating delivery device 1040. As discussed above, the solid particulate coating delivery device 1040 may comprise, for example, a variety of devices and combinations of devices. The solid coated metallic substrate 1014 is then subjected to a curing device 1030 for curing the adhesive coating 1018 using methods discussed above. When the metallic substrate cools after curing, the solid particulate coating 1020 is adhesively retained by the adhesive coating 1018.

Figure 11:
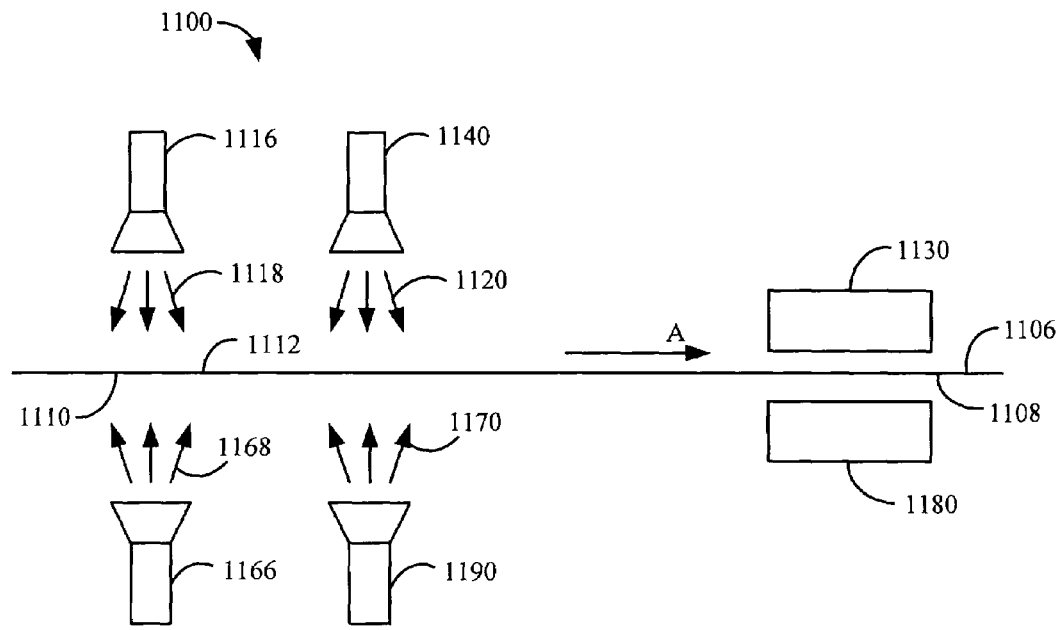
FIG. 11 illustrates an embodiment of a system for applying ozone-depleting catalysts to multiple surfaces of a metallic substrate.

Reference is now made to FIG. 11, which illustrates a side view of an embodiment of a system of applying ozone-depleting catalysts to multiple surfaces of a metallic substrate. The metallic substrate 1110 moves in direction A and receives liquid coating 1118, 1168 on the first and second surfaces, 1106, 1108, respectively. The liquid coatings 1118 and 1168 are delivered via first and second liquid coating delivery devices 1116 and 1166, respectively. The liquid coated metallic substrate 1112 is then exposed to concentrations of solid particulate coating particles 1120, 1170 on the first and second surfaces 1106, 1108, respectively. The solid particulate coating concentrations 1120, 1170 are delivered using solid particulate coating delivery devices 1140, 1190, respectively. The solid coated metallic substrate is then cured using curing devices 1130, 1180. One of ordinary skill in the art will appreciate that the liquid coating delivery devices 1116, 1166, the solid particulate coating delivery devices 1140, 1190, and the curing devices 1130, 1180 may be any combination of the devices discussed above. Further, any of the methods or systems as disclosed above are applicable for coating multiple surfaces of a substrate.

Figure 12:
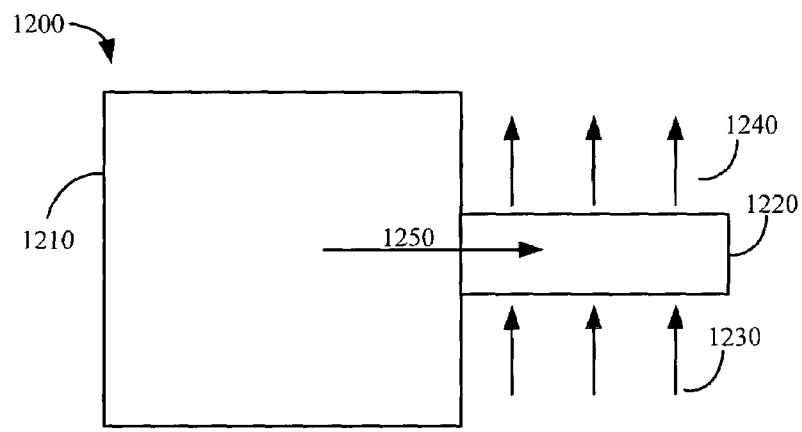
FIG. 12 illustrates an embodiment of an apparatus for using a heat exchanger having an ozone depleting catalytic coating.

Brief reference is now made to FIG. 12, which illustrates an embodiment of an apparatus using an ozone depleting coated heat exchanger. The apparatus 1200 generally contains a heat producing device 1210 and a heat exchange device 1220. A heat producing device may be a refrigeration type system including but not limited to air conditioners, heat pumps, refrigerators and freezers. Alternatively, the heat producing device 1210 may be a combustible fuel powered device including but not limited to engines which consume diesel, gasoline, propane, natural gas, coal or other combustible fuels.

By way of example, the heat 1250 is transferred to the heat exchange device 1220 for elimination. The heat exchange device utilizes air the transfer the heat from an internally contained heat transfer medium. One of ordinary skill in the art will appreciate that the air may be moved across the heat exchange device, the heat exchange device may be moved through the air or, some combination thereof. Untreated air 1230 having an ozone content enters the heat exchange device 1220. As the entering untreated air 1230 contacts the coated portions of the heat exchanging device 1220, ozone is reduced to oxygen by the catalytic particles and treated air 1240 exits the heat exchange device 1220.

Yet another alternative embodiment of the systems and methods disclosed includes a heat exchanger composed substantially of non-metallic substrate. The non-metallic substrate, for example, has an adhesive property initiated when heated, consistent with the discussion above corresponding to the heat activated adhesive coating. The substantially non-metallic heat exchanger would be heated and then the solid particulate coating applied using, for example, the above methods. The substrate can be, for example, a plastic, co-polymer, composite or other thermally conductive non-metallic material.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A method for applying an ozone-depleting coating to a heat exchange device, comprising:
    applying, to a metallic sheet, a liquid coating including a heat-activated adhesive characteristic;
    curing the liquid coating;
    producing a heat exchange device, wherein the coated metallic sheet comprises a component thereof;
    heating the heat exchange device to activate the heat-activated adhesive characteristic of the cured liquid coating on the component; and
    contacting the heat exchange device with a solid particulate coating that includes a plurality of particles, wherein the solid particulate coating adheres to the heat exchange device via the heat-activated adhesive characteristic of the liquid coating.

2. The method of claim 1, wherein the metallic sheet is aluminum.

3. The method of claim 1, wherein the liquid coating is a heat-activated polymer.

4. The method of claim 1, the applying step further comprising contacting the metallic sheet with a roll, wherein the roll delivers the liquid coating to the metallic sheet.

5. The method of claim 4, wherein the roll contacts a solution of the liquid coating.

6. The method of claim 1, wherein the curing step comprises applying heat to the coated metallic sheet, wherein the heat is generated by a first heat generating apparatus.

7. The method of claim 6, wherein the coated metallic sheet is heated to a temperature in the range between 250 and 550 degrees Fahrenheit.

8. The method of claim 7, wherein the temperature range is preferably between 300 and 500 degrees Fahrenheit.

9. The method of claim 7, wherein the temperature range is preferably between 400 and 450 degrees Fahrenheit.

10. The method of claim 1, wherein the heating step further comprises applying heat to the heat exchange device from a second heat generating apparatus.

11. The method of claim 10, second heating apparatus comprising an electrical resistance heating apparatus.

12. The method of claim 1, wherein the contacting step further comprises positioning the heat exchange device in contact with a concentration of solid particulate coating particles, such that the solid particulate coating adheres to the surface of the heat exchange device.

13. The method of claim 12, wherein the concentration of solid particulate coating particles comprises a fluidized bed.

14. A method for applying an ozone-depleting coating to a heat exchange device, comprising:
    applying, to a metallic sheet, a liquid coating including a heat-activated adhesive characteristic;
    drying the liquid coating to a dried liquid coating;
    producing a heat exchange device, wherein the coated metallic sheet comprises a component thereof;
    heating the heat exchange device to activate the heat-activated adhesive characteristic of the dried liquid coating; and
    contacting the heat exchange device with a solid particulate coating that includes a plurality of particles, wherein the solid particulate coating adheres to the heat exchange device via the heat activated characteristic of the dried liquid coating and wherein the solid particulate coating comprises manganese dioxide.

15. The method of claim 14, wherein the metallic sheet is aluminum.

16. The method of claim 14, wherein the liquid coating is a heat-activated polymer.

17. The method of claim 14, the applying step further comprising:

contacting a solution of the liquid coating with a roll; and contacting the metallic sheet with the roll, wherein the roll delivers the liquid coating to the metallic sheet.

18. The method of claim 14, wherein drying the liquid coating to a dried liquid coating comprises applying heat to the coated metallic sheet, wherein the heat is generated by a first heat generating apparatus.

19. The method of claim 18, wherein the coated metallic sheet is heated to a temperature in the range between 250 and 550 degrees Fahrenheit.

20. The method of claim 18, wherein the coated metallic sheet is heated to a temperature in the range between 300 and 500 degrees Fahrenheit.

21. The method of claim 18, wherein the coated metallic sheet is heated to a temperature in the range between 400 and 450 degrees Fahrenheit.

22. The method of claim 14, wherein heating the heat exchange device to activate the heat-activated adhesive characteristic of the dried liquid coating comprises applying heat to the heat exchange device from a second heat generating apparatus.

23. The method of claim 22, second heating apparatus comprising an electrical resistance heating apparatus.

24. The method of claim 14, wherein contacting the heat exchange device with a solid particulate coating that includes a plurality of particles comprises positioning the heat exchange device in contact with a concentration of solid particulate coating particles, such that the solid particulate coating adheres to the surface of the heat exchange device.

25. The method of claim 24, further comprising stirring an accumulation of solid particulate coating particles using an air and/or gas fluidizing input, wherein the concentration of solid particulate coating particles comprises a fluidized bed.

* * * * *